J. B. Lyons,
Stump Elevator,
N° 31,812. Patented Mar. 26, 1861.
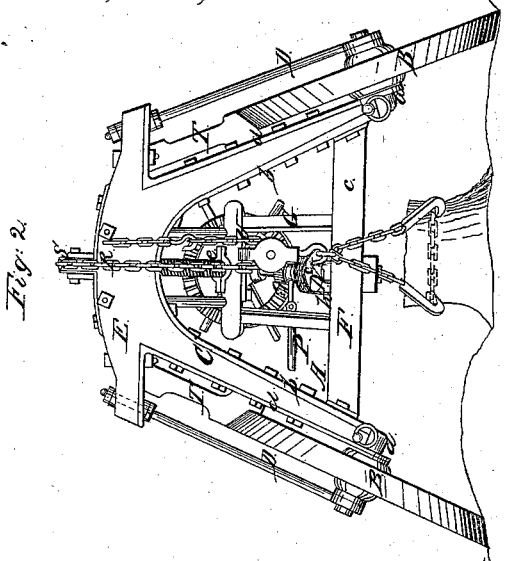
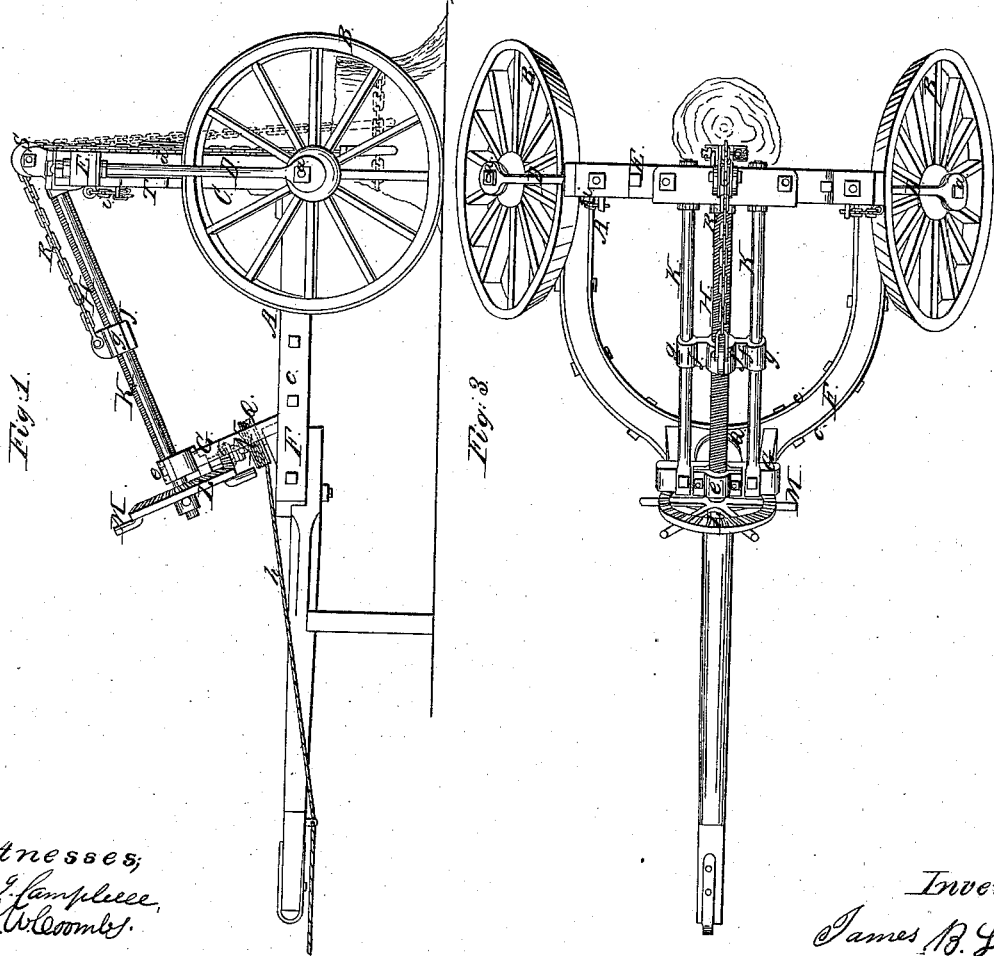
Witnesses:
R. J. Campbell
J. W. Coombs
Inventor;
James B. Lyons.

UNITED STATES PATENT OFFICE.

JAMES B. LYONS, OF BALTIMORE, MARYLAND.

STUMP-EXTRACTOR, &c.

Specification of Letters Patent No. 31,812, dated March 26, 1861.

*To all whom it may concern:*

Be it known that I, JAMES B. LYONS, of Baltimore, in the State of Maryland, have invented a new and Improved Stump-Extractor and Elevator and Conveyer; and I do hereby declare that the following is a full, clear, and exact description of the same, reference being had to the annexed drawings, making a part of this specification, in which—

Figure 1. is a side view of my invention; Fig. 2. a back view of the same; Fig. 3. a plan or top view of the same.

Similar letters of reference indicate corresponding parts in the several figures.

The object of this invention is to obtain a machine whereby stumps may be extracted from the earth and heavy weights readily elevated and transported from place to place, large stones, for instance, elevated and laid to form walls, the work being done by a very moderate application of power, and the machine so constructed as to admit of a very ready adjustment to its work as well as a greater or less application of power as the nature of the work may require.

To enable those skilled in the art to fully understand and construct my invention I will proceed to describe it.

A. represents a truck which is supported or mounted on two wheels B. B. that have an inclined position, as shown clearly in Fig. 2. the upper parts of the wheels being nearer each other than the lower parts. This inclination is given the wheels by having the arms $a$, in which they are placed, inclined. These arms are formed at the ends of a metal bar $b$, which is bolted to the inner side of an inverted V-shaped standard C. that forms the upright portion of the truck frame and is shown clearly in Fig. 2. The outer ends of the arms $a$, $a$, on which the wheels are placed are stayed or braced by rods D. D. the upper ends of which are secured in the ends of a traverse bar E. on the top of the part C. of the truck frame. These rods D. D. are very essential as the inclined position of the arms $a$, $a$, require that they be securely stayed or braced to prevent them bending or breaking under the strain to which they are subjected when the device is at work, as will be hereinafter referred to. The peripheries or treads of the wheels B. B. have an oblique position with their arms $a$, $a$, each wheel being a frustum of a cone, as shown in Figs. 2 and 3. By this means the wheels although having oblique positions have the portions of their peripheries which are in contact with the ground parallel therewith.

F. represents a horizontal portion of the framing, said portion being of bow or semi-circular shape and having its ends secured to the lower ends of the upright portion C. of the truck frame. The inner and outer sides of the part F. of the truck frame have metal plates $c$, bolted to them, the part F. as well as part C. being of wood. The outer side of part C. is also plated with metal as shown at $d$. On the front end of the part F. of the truck frame there is secured obliquely a small upright frame G. on which the bearing $e$, of a screw H. is placed, the other bearing of the screw being in the traverse bar E. of the part C. of the truck frame, see Figs. 1 and 3. On the screw H. there is placed a nut J. which has lateral arms $f$, $f$, projecting from it, one from each side. These arms have each a small tube $g$, attached, and said tubes are fitted and work on rods K. K. which are placed one at each side and parallel with the screw H. as shown clearly in Fig. 3. To the front end of the screw H. a bevel toothed wheel L. is attached. This wheel has radial handles M. secured to it for the purpose of turning the screw manually when desired.

N. is a shaft placed at the front end of the part F. of the truck frame and having a sliding bevel pinion O. on it, said pinion being actuated or moved by a lever P. so as to be thrown in and out of gear with wheel L. as desired. On the lower part of shaft N. there is placed a drum Q. having a rope or chain $h$, wound on it.

R. is a chain which is attached to the nut J. of screw H. and passes over a pulley S. on the traverse bar E. of the part C. of the truck frame.

T. T. are wedges secured to the ends of the traverse bar E. by chains $i$, $i$. These wedges when the machine is at work or is not designed to be moved are inserted between the upper parts of the wheels B B. and the ends of the traverse bar E. as shown in Fig. 2, and effectually prevent the casual turning of the wheels.

The operation of the machine is as follows. The device is drawn along by a team to the desired spot, and is so adjusted that the article to be lifted will be between the wheels B. B. The wheels B. B. are then secured by the wedges T. T. and the chain R. applied to the article to be raised or extracted from the earth, a stump being represented in the drawings. If much power is not required to extract the stump the chain R. is directly attached to it, and the screw H. turned by turning the wheel L. manually the stump being extracted by the movement of the nut on the screw H. In case considerable power is required the chain R. instead of being directly applied to the stump may be attached thereto through the medium of a tackle U. as shown in Fig. 2, and if very great power is required the pinion O. may be thrown in gear with the wheel L. and a draft animal attached to the chain or rope $h$. Thus it will be seen that varying degrees of power may be applied to the screw H. as the nature of the work may require, and it will also be seen that in consequence of having the wheels B. B. in oblique positions as shown a broad base is given the machine and the latter prevented from upsetting and sufficient space allowed between the wheels to prevent the latter interfering with the work. The rods D. D. effectually prevent the bending of the arms $a$, $a$, a contingency which would be liable to occur owing to the downward pressure to which the same are subjected under the power of the screw during the hoisting operation.

Having thus described my invention what I claim as new and desire to secure by Letters Patent, is,

1. The combination of the double bow truck frame A. mounted on oblique conical wheels B. with the hoisting device formed of the screw H. nut J. and chain R. all being arranged for joint operation substantially as and for the purpose set forth.

2. The combination of the screw H. nut J. gearing L. O. and the drum Q. with chain or rope $h$, attached, arranged and applied to the truck to operate as and for the purpose specified.

JAMES B. LYONS.

Witnesses:
M. M. LIVINGSTON,
JAMES LAIRD.